(12) United States Patent
Boger

(10) Patent No.: US 9,051,016 B2
(45) Date of Patent: Jun. 9, 2015

(54) BICYCLE TRAINING HANDLE

(71) Applicant: Brad Boger, Lutz, FL (US)

(72) Inventor: Brad Boger, Lutz, FL (US)

( * ) Notice: Subject to any disclaimer, the term of this patent is extended or adjusted under 35 U.S.C. 154(b) by 0 days.

(21) Appl. No.: 14/050,801

(22) Filed: Oct. 10, 2013

(65) Prior Publication Data

US 2015/0101149 A1   Apr. 16, 2015

(51) Int. Cl.
*B62H 7/00*   (2006.01)

(52) U.S. Cl.
CPC ......................................... *B62H 7/00* (2013.01)

(58) Field of Classification Search
CPC ........................................................ B62H 7/00
USPC .............................. 280/293, 292, 288.4, 304.5
See application file for complete search history.

(56) References Cited

U.S. PATENT DOCUMENTS

| | | | | |
|---|---|---|---|---|
| 2,672,351 A | * | 3/1954 | Kane ........................... | 280/288.4 |
| 4,917,398 A | | 4/1990 | de Miranda Pinto | |
| 5,154,096 A | * | 10/1992 | Geller et al. ................. | 74/551.8 |
| 5,303,944 A | * | 4/1994 | Kalmus ...................... | 280/288.4 |
| 5,558,348 A | * | 9/1996 | Becka .......................... | 280/282 |
| 5,564,726 A | * | 10/1996 | Hearn et al. .................. | 280/293 |
| 5,577,750 A | * | 11/1996 | Sklar ............................. | 280/293 |
| D384,602 S | | 10/1997 | Anderberg | |
| 5,791,675 A | * | 8/1998 | Fleischer ...................... | 280/293 |
| 5,915,711 A | * | 6/1999 | Seiple ........................... | 280/293 |
| D422,947 S | | 4/2000 | Brathwaite | |
| 6,120,050 A | * | 9/2000 | Tillim ........................... | 280/293 |
| 6,398,248 B1 | * | 6/2002 | Dodson ......................... | 280/293 |
| 6,474,670 B2 | | 11/2002 | Shaw | |
| 6,488,302 B2 | | 12/2002 | Coates | |
| 6,712,376 B2 | | 3/2004 | Eberhardt | |
| 7,540,519 B1 | * | 6/2009 | Coyle ........................... | 280/293 |
| 8,382,139 B2 | * | 2/2013 | Schexnayder et al. ......... | 280/293 |
| 2002/0030346 A1 | * | 3/2002 | Coates ........................... | 280/293 |
| 2002/0096858 A1 | * | 7/2002 | Shaw ............................. | 280/293 |
| 2003/0168829 A1 | * | 9/2003 | Merrill .......................... | 280/293 |
| 2012/0280471 A1 | * | 11/2012 | Schexnayder et al. ......... | 280/304 |
| 2013/0115577 A1 | * | 5/2013 | Donnell .......................... | 434/61 |
| 2014/0265235 A1 | * | 9/2014 | Staab ............................. | 280/293 |

* cited by examiner

*Primary Examiner* — Joseph Rocca
*Assistant Examiner* — Michael Stabley
(74) *Attorney, Agent, or Firm* — Daniel Boudwin; Global Intellectual Property Agency LLC

(57) ABSTRACT

A bicycle riding training handle is provided that is operably attachable to the post of a bicycle seat without removing the same. The assembly utilizes a quick connect cam locking means that secures around the outer portion of the seat post, wherefrom the elongated handle curves upward and backward toward a standing user. The attachment end of the handle affixes to the seat post of the bicycle and the gripping end is held by a standing user for balance support and for controlling the speed of the bicycle. Optionally extending from the attachment end of the handle is a secondary frame attachment member, which pivotably attaches to the bicycle frame in front of or behind the seat post to prevent rotation of the handle during use. Finally, the elongated handle is provided in a telescoping design to allow the handle position to be adjusted for standing users of different size.

15 Claims, 4 Drawing Sheets

BICYCLE TRAINING HANDLE

BACKGROUND OF THE INVENTION

1. Field of the Invention

The present invention relates to bicycle training assistants and supports that allow a user to assist another learning to ride a bicycle. More specifically, the present invention relates to an improvement to bicycle training handles that incorporates a quick-attach member that is adapted to be supported by the bicycle seat post, along with elements to prevent the device from rotating after initial placement on the bicycle.

Riding a bicycle requires balance and skill, which are acquired over the course of training on the bicycle. Most individuals learn to ride a bicycle at a young age and under the supervision of their parent or guardian. When children first learn to ride, most parents provide a bicycle with rear-mounted training wheels attached thereto, whereby the need to balance the bicycle is eliminated as the child learns to peddle the bicycle and become accustomed to sitting thereon. An alternative to training wheel bicycles are push bicycles that remove the pedals altogether and allow the child to balance the bicycle with their feet and learn how coast without touching the ground. The push cycles are pedal-less and therefore are for early training purposes only, while the training wheel bicycles are fully operational peddle bicycles that can be switched to a free standing bicycle after a period of training.

While both of these training bicycles allow a child to become accustomed to the riding motion, they lack the final step of allowing the child to pedal and ride without assistance once mastering the initial steps. Most parents remove the training wheels and grasp the rear of the bicycle seat during this transition period, and let go of the bicycle when the child has achieved sufficient balance and control of the bicycle. This method is quite useful during the final training period and allows the user to operably control the cycle and release the same as desired. However, there are drawbacks to this method that can result in injury to the cycling user or the standing user. Notably, the gripping area of the seat rear is minimal and does not allow full control of the bicycle once the child begins pedaling. Furthermore, the standing user must bend over significantly to grasp the bicycle, which can be awkward in practice and especially so when the bicycle picks up speed.

An advanced method of controlling a bicycle from behind and from the bicycle seat is disclosed in the art, and includes an elongated handle that extends from the rear of the bicycle for a standing user to grasp and maintain control of the bicycle as a child learns on a fully-operational version thereof. Several devices have been disclosed that relate to this type of device, and generally relate to an elongated handle having a gripping portion and an opposing end portion that clamps to the bicycle in some form or fashion. These connections require the bicycle seat to be removed prior to attachment of the device thereto, or require tools for mounting the same. The present invention contemplates a new and improved bicycle training handle that is operably connected to a bicycle seat post without removal thereof and without tools, while also providing optional secondary frame attachment components that prevent the handle from rotating about the seat post or causing the seat post itself to rotate based on input on the handle. These improvements advance the art of assisted bicycle training devices, whereby a standing user can more rapidly apply and remove the training handle and the user can exert greater control over the bicycle during use.

2. Description of the Prior Art

Devices have been disclosed in the prior art that relate to bicycle training devices and handles that attach thereto. These include devices that have been patented and published in patent application publications, generally relate to handles that are affixed to a bicycle that require removal of the bicycle seat or require tools to attach thereto, and further to those that attach in at a single point to the bicycle. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 4,917,398 to de Miranda Pinto, which discloses a bicycle training handle that is pivotably mounted to the rear axle of the bicycle, whereby the device can pivot from its connection to the bicycle to place the hand end at an advantageous position relative to the user behind the bicycle. The handle pivots in the same plane as the bicycle wheel rotation while the handle is adapted to be telescoping in order to extend the handle away from the rear wheel of the bicycle as necessary. While disclosing a device for a similar goal of the present invention, the present invention contemplates an attachable handle member that is adapted to quick-connect to the seat post of the bicycle and include elements that prevent rotation thereabout.

Another device is U.S. Pat. No. 6,712,376 to Eberhardt, which discloses a bicycle training device that includes a quick release sleeve for securing to the seat post of a bicycle seat. The quick release sleeve includes a bore and a fastener to draw the sleeve together around the seat post, and support an elongated handle therefrom. The hand extends largely upward from the seat post for a user standing just adjacent to the bicycle. The quick release sleeve of Eberhardt, while providing a means to secure the device without tools, does not allow a user to operably connect the device to a seat post without first removing the seat from the bicycle frame. The present invention contemplates a clamping means that has an opening adapted to accept rounded posts therein, whereafter the sides of the clamping means are drawn together by a cam locking means. This allows the present invention to be attached to an exposed post without requiring access to an end thereof, whereby the clamping means can be placed against the seat post and tightened therearound without removing the seat post.

U.S. Pat. No. 6,474,670 to Shaw discloses a bicycle balancing and training device that includes a bracket attachable to the seat post of a bicycle and a U-shaped member extending therefrom. The U-shaped member attaches to a closed handle, wherein the U-shaped member is pivotably adjustable from the connection to the seat post. In this way, the user can use one or two hands to assist a cycling user. The handle can also be extended from the U-shaped member for placing the same at different offsets from the seat post. While providing a similar assistant for a cycling user, the Shaw structure diverges significantly and fails to disclose the secondary frame attachments of the present invention.

Finally, U.S. Pat. No. 6,488,302 to Coates discloses a bicycle training handle that includes a bar with a forward and rear ends, a clamp for securing to the bicycle seat post, and a straight gripping portion that angles upward and forwardly for the user to grasp while standing behind the bicycle. Coates also discloses a quick release mechanism that includes a U-shaped portion adapted to accept the seat post therein and secure the assembly thereto. However, the Coates device fails to anticipate the quick release mechanism of the present invention nor does it suggest a secondary frame attachment that stabilizes the bicycle training handle. The present invention contemplates a quick release attachment that comprises cam lock mechanism and secondary attachments that stabilize the handle attachment to the seat post and prevent rotation thereabout or rotation of the seat during use.

The present invention discloses a new and novel bike training device that comprises an elongated handle, a quick connect to a bicycle seat post, and secondary frame attachment members that assist in supporting the handle when attached to the bicycle frame. The present invention is an improvement in the art and allows a user to have greater control over the bicycle and more easily apply or remove the device between uses. It is submitted that the present invention substantially diverges in design elements from the prior art, and consequently it is clear that there is a need in the art for an improvement to existing bicycle training handle devices. In this regard the instant invention substantially fulfills these needs.

SUMMARY OF THE INVENTION

In view of the foregoing disadvantages inherent in the known types of bicycle training devices now present in the prior art, the present invention provides a new bicycle training handle device that can be utilized for providing convenience for the user when assisting a child learning to ride a bicycle and controlling the movement of the bicycle while standing behind the same.

It is therefore an object of the present invention to provide a new and improved bicycle training handle device that has all of the advantages of the prior art and none of the disadvantages.

It is another object of the present invention to provide a bicycle training handle device that attaches via a quick connect to a bicycle seat post and provides a graspable handle positioned above and behind the bicycle seat for an adult supervising the riding activity to control the bicycle and assist the pedaling user.

Another object of the present invention is to provide a bicycle training handle device that includes a curved construction that places the graspable portion of the handle at an advantageous position with respect to a standing user, whereby the standing user can assist the pedaling user in balancing and can rapidly halt the bicycle in the event of an impending collision.

Yet another object of the present invention is to provide a bicycle training handle device that utilizes a cam lock device to attach to the bicycle seat post without requiring the seat to be removed from the bicycle and not requiring the user to operate any tools during the attachment or removal process.

Another object of the present invention is to provide a bicycle training handle device that includes optional secondary attachment members, wherein hingeable bicycle frame attachments extend from the handle to stabilize its position relative to the seat post and stabilize the seat post itself when the standing user exerts control or imparts load on the handle during use.

Another object of the present invention is to provide a bicycle training handle device that further contemplates a telescoping construction to allow for adjusting the height and rear offset of the graspable portion of the handle with respect to the bicycle for improved user ergonomics when grasping the device.

A final object of the present invention is to provide a bicycle training handle device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
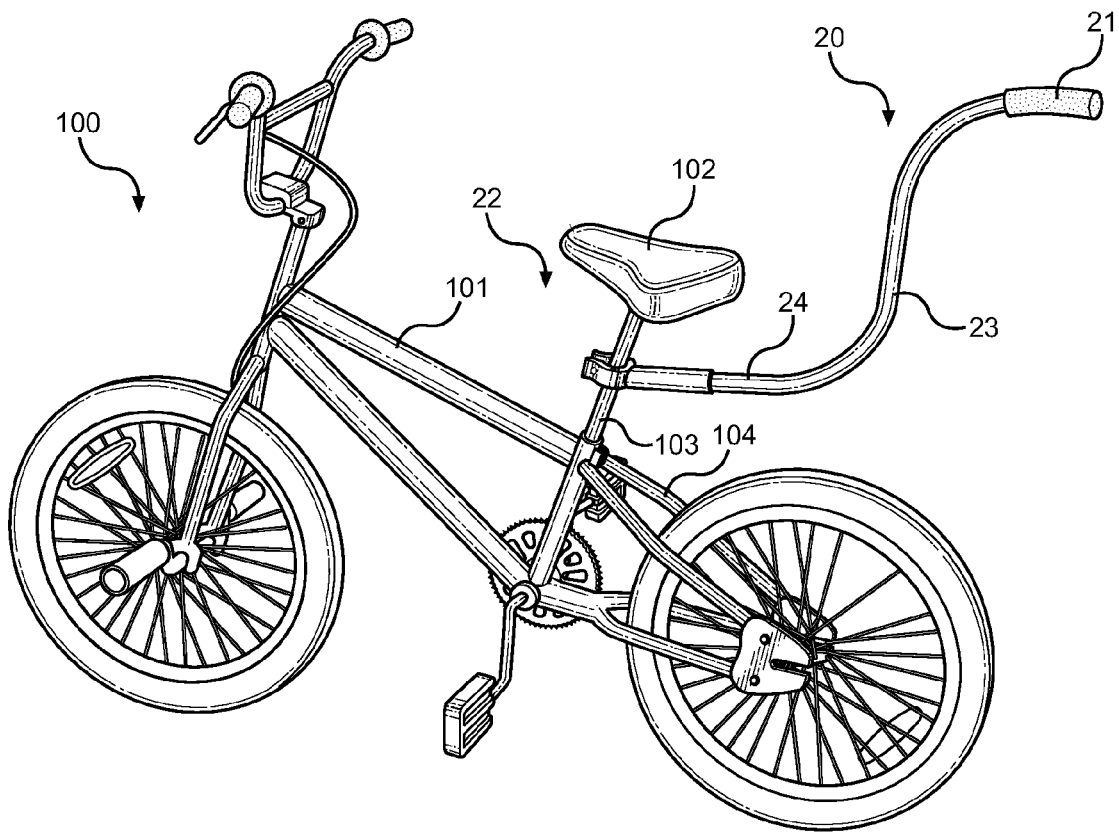
FIG. 1 shows a perspective view of the preferred embodiment of the bicycle training handle device of the present invention in a working state, attached to the seat post of a bicycle.

Reference is made herein to the attached drawings. Like reference numerals are used throughout the drawings to depict like or similar elements of the bicycle training handle. For the purposes of presenting a brief and clear description of the present invention, the preferred embodiment will be discussed as used for assisting a user learning to ride a bicycle and allowing a standing user to improve the cyclist's balance and ultimately control motion of the bicycle in the event of an emergency. The figures are intended for representative purposes only and should not be considered to be limiting in any respect.

Referring now to FIG. 1, there is shown a perspective view of the bicycle training handle 20 of the present invention in a working state, attached to a bicycle 100 for the purposes of providing a means of assisting a pedaling user while standing behind the bicycle 100. The handle 20 comprises an elongated member having a gripping end 21, a central upstanding portion 23 and a bicycle seat post attachment end 24. The handle 20 comprises a substantially "S" shape, where the attachment end 24 is largely horizontal, the central portion 23 curves upward, and the gripping end 21 curves towards the horizontal for a user to grasp while standing. The device is useful for assisting with balance and for controlling the motion of the bicycle, similar to a rigid leash, such that a parent can protect a child from pedaling too fast or pedaling towards an impending collision.

Figure 4:
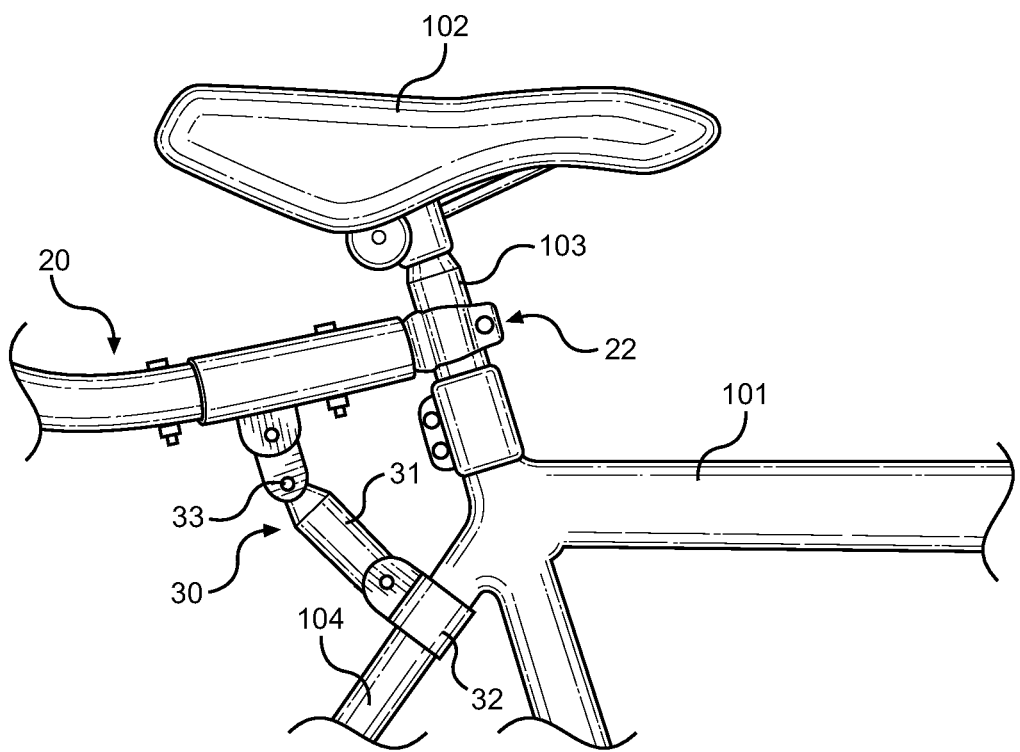
FIG. 4 shows a view of the first contemplated secondary frame attachment member of the present invention.
Figure 5:
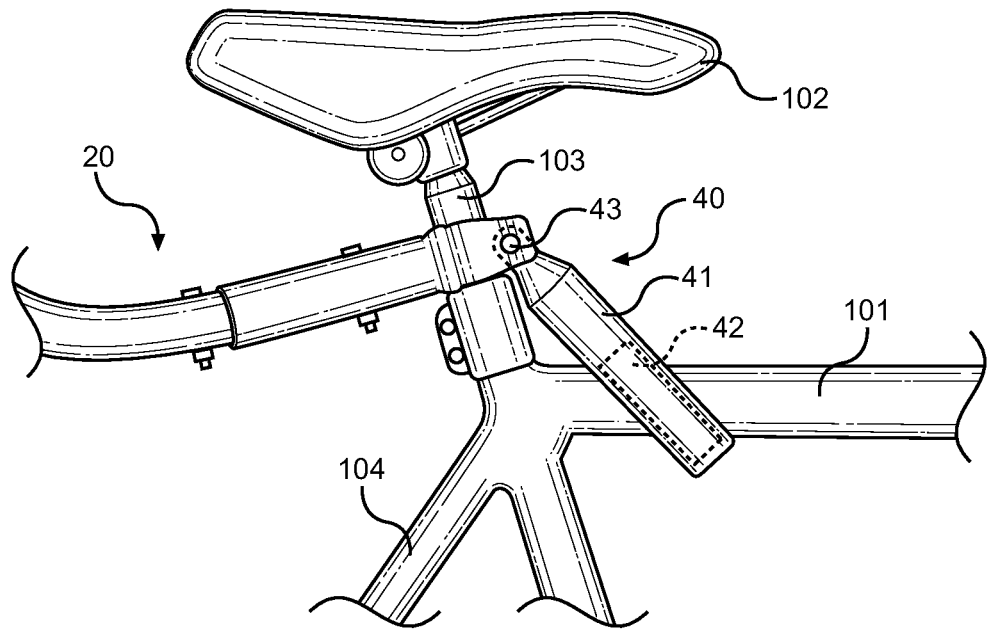
FIG. 5 shows a view of the second contemplated secondary frame attachment member of the present invention.
Figure 7:
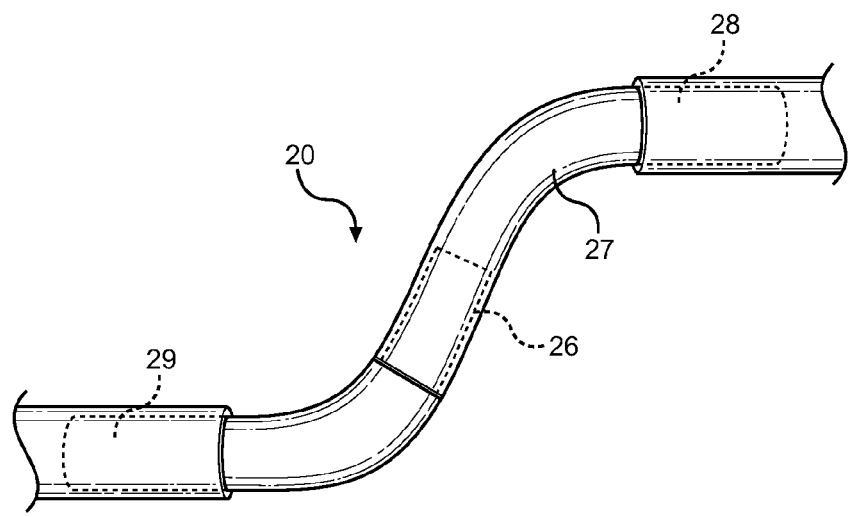
FIG. 7 shows the telescopic relationship of the adjustable embodiment of the device.

The attachment end 24 includes a quick attachment mechanism 22 that surrounds and secures to the seat post 103 without requiring the user to first remove the bicycle seat 102 or utilize tools during the installation/removal process. The attachment mechanism 22 secures the attachment end 24 of the handle such that inputs made to the gripping end 21 of the handle are imparted to the bicycle seat post 103 and ultimately to the frame of the bicycle 100. Along with this attachment, secondary frame attachment members are contemplated for securing the attachment end 24 of the handle 20 to the bicycle frame, wherein rotation of the handle 20 is prevented about the seat post 103, and further rotation of the seat post 103 about the bicycle frame is prevented when controlling the handle 20. These secondary frame attachment members create a second attachment point that secures the handle 20 to the bicycle frame upper rail 101 or to the bicycle rear frame 104. These secondary frame attachment members are shown in FIGS. 4, 5 and 7.

Figure 2:
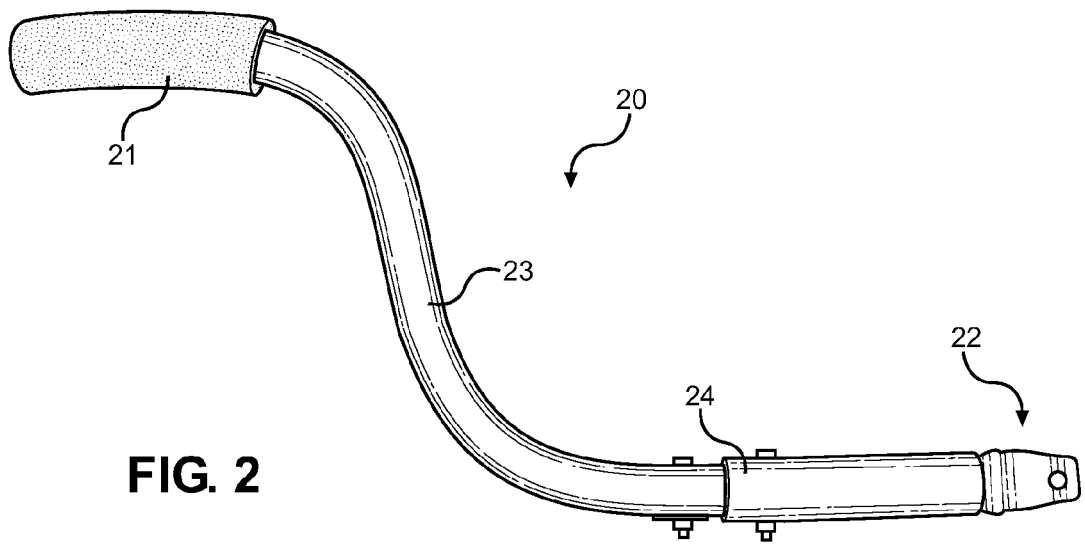
FIG. 2 shows a side view of the preferred embodiment of the bicycle training handle device of the present invention.

Referring now to FIG. 2, there is shown a side view of the bicycle training handle 20 of the present invention. This view shows the "S" shape of the device, which places the gripping end 21 at an elevated and horizontal position relative to the bicycle seat post for the user to readily handle and control while walking beside a pedaling user. The central portion 23 of the handle 20 is an upstanding portion of the handle 20 that connects the largely horizontal attachment end 24 and gripping end 21 of the handle, and offsets the gripping end 21 from the attachment end 24.

The handle 20 preferably comprises a tubular construction having sufficient rigidity and strength to transfer inputs on the gripping end 21 to the attachment end 24 without flexing or deforming its shape. The stiffness of the handle 20 allows inputs on the gripping end 21 to be instantaneously transferred to the bicycle, and prevents any lag on those inputs. The strength of the construction further prevents the handle 20 from snapping or failing during use, which could pose a danger to the pedaling user and a liability for the manufacturer. It is contemplated that high strength and high stiffness plastics or tubular metallic materials are utilized in the construction of the device, while excessive weight thereof is minimized to reduce any impact on the bicycle's handling characteristics.

Figure 3:
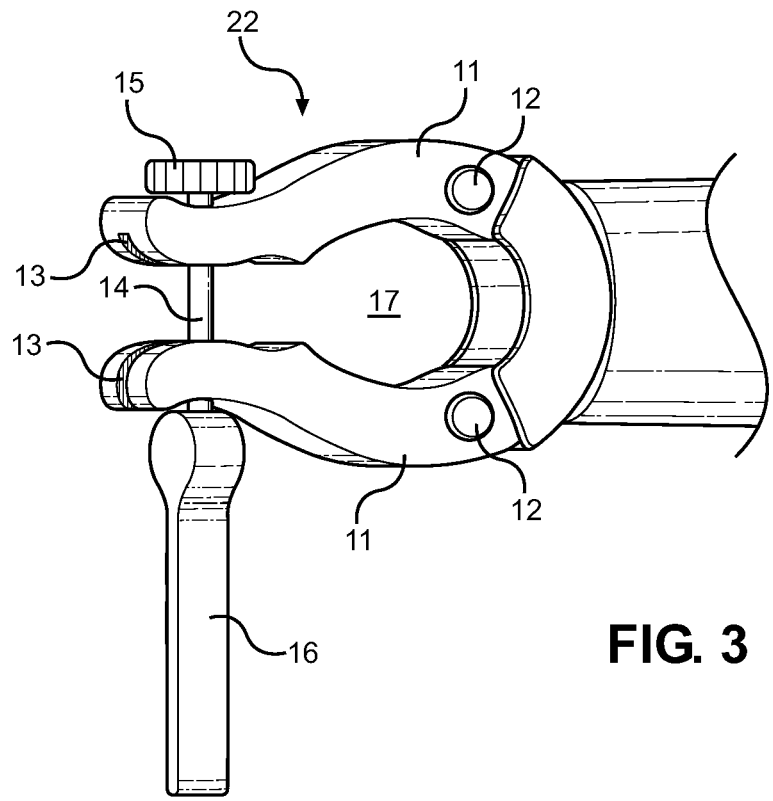
FIG. 3 shows a view of the preferred quick connect of the present invention, which does not require removal of the bicycle seat and can secure therearound without tools.

Referring now to FIGS. 2 and 3, the quick attachment mechanism 22 is shown. It is preferred that this connection allow a user to secure the handle 20 to the seat post of a bicycle without having to remove the seat post to fit the attachment, and further to allow attachment or removal without the use of tool. The preferred embodiment surrounds the seat post and secures firmly therearound, wherein the connection compresses the seat post perimeter and bears thereagainst to prevent rotation therearound during use.

As shown in FIG. 3, the preferred attachment is an expandable cam locking mechanism 22. The cam lock 22 includes a first and second arm member 11 that is pivotably connected to the handle via a pin joint 12. The arm members 11 include an interior surface and an exterior surface, wherein the interior surface is adapted to abut against the seat post when the seat post is accepted between 17 the arm members 11. The arm member 11 and the location of the pin joints 12 create an open interior space 17 within which to accept an exposed member (e.g. the seat post). Once positioned around the seat post, the ends of the arm members 11 are secured together via a cam lock 16 and swing bolt 14. The swing bolt 14 is an elongated member that is fitted through slots 13 in the arm member 11 ends, wherein the ends of the swing bolt 14 are drawn together to shorten its length and thus compress the ends of the arm members 11 together. The swing bolt is adjustable in length via a turn nut 15, which shortens or lengthens the exposed length of the bolt 14 prior to engaging the cam lock 16. The cam lock provides the final tensioning of the bolt 14 that draws the arms 11 together about the seat post.

This embodiment of the attachment mechanism 22 is but one contemplated embodiment. It is desired that any attachment mechanism that can accept and secure around an exposed post is suitable for supporting the handle therefrom. The goal of this mechanism is to attach to the bicycle seat post without first removing the same, and further to eliminate the need for any tools during the mounting or removal process. This allows users to quickly and easily apply or remove the handle as desired, and does not limit owners to those that have readily available tools.

Referring now to FIG. 4, there is shown a view of the first contemplated embodiment of the secondary frame attachment member 30. This embodiment 30 includes an attachment to the bicycle rear frame portion 104, which extends behind the seat post 103 and supports the rear wheel of the bicycle. In this embodiment, the secondary frame attachment member 30 makes connection with the rear frame portion 104 to create a secondary attachment point on the bicycle such that the handle 20 cannot rotate and the seat post 103 does not rotate when given inputs by the standing user. The quick attachment mechanism 22 of the handle is preferably utilized at the frame attachment end 32 of the secondary attachment member 30, wherein any tubular portion of the bicycle frame can be secured to by way of a cam lock or similar attachment mechanism. This attachment member 30 requires only lateral support, wherein rotation of the handle 20 is prevented and side loads on the handle 20 are thus transferred to the frame through this member 30. Therefore, a firm attachment around the frame is not required, only one that allows the member 30 to bear against the frame from both sides thereof. The second contemplated attachment mechanism for this member 30 is shown in FIG. 7 and will be discussed below.

The rear frame attachment member 30 of FIG. 4 may further include a first and/or second pivot joint 33 therealong to correctly orient the member 30 with respect to the position of the rear frame portion 104 of the bicycle. Thus, the member 30 can pivot into an opportune position relative to the frame and therefore a specific design for each bicycle frame is not required. The member 30 includes an elongated body portion 31 that pivots from the handle 20 and extends downward therefrom. At least one pivot joint 33 is provided for orienting the body portion 31 relative to the frame rear portion 104 of the bicycle for connection 32 thereto. In this way, side loads on the handle 20 are imparted through the member 30 and not as a torsion load on the seat post 103.

Referring now to FIG. 5, there is shown a second contemplated embodiment of the secondary frame attachment member 40, along with the second contemplated attachment end 42 thereof. This embodiment 40 contemplates a pivoted member 41 that secures to the bicycle frame upper rail 101 to prevent rotation of the handle 20 during use. The secondary frame member 40 is pivotably mounted to the end of the handle quick attachment mechanism and pivots downward from the attachment mechanism's position around the seat post 103 to secure to the bicycle frame upper rail 101. In this embodiment, the secondary frame attachment member 40 includes an elongated body 41, a pivotable connection 43 with respect to the handle attachment end, and a frame attachment end 42 that secures to the bicycle upper frame rail or surround the same to impart lateral loads thereon.

Figure 6:
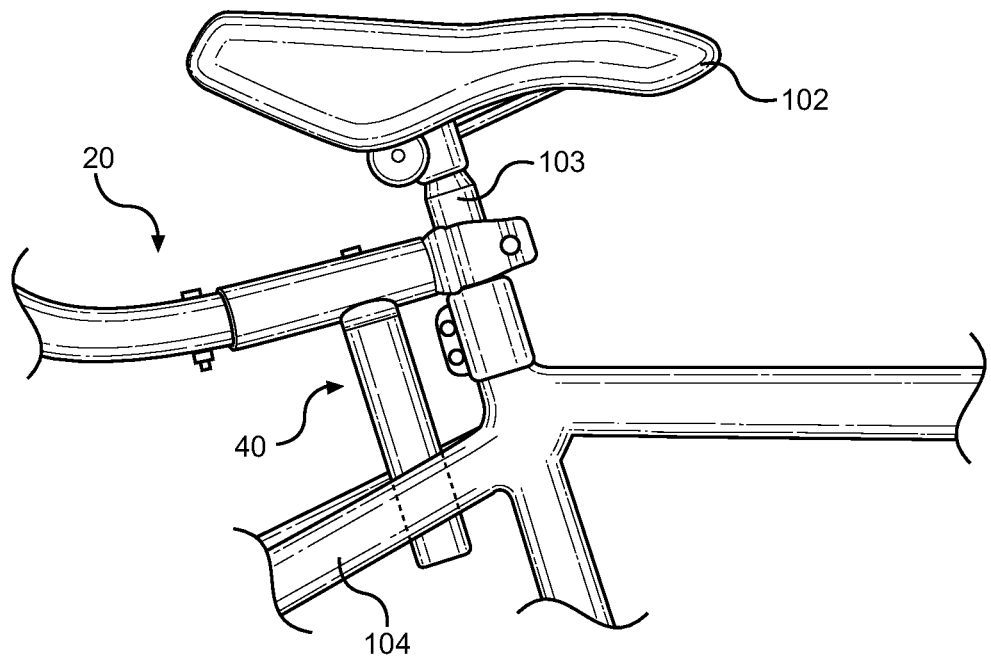
FIG. 6 shows a view of yet another contemplated secondary frame attachment member of the present invention.

Referring to FIG. 6, there is shown yet another embodiment of the secondary frame attachment member 40. In this embodiment, the attachment member 40 comprises a downwardly projecting post that is adapted to secure within an open portion of a bicycle frame rear of the seat post 103. In this way, the post can bear against the frame and resist rotation about the seat post 103 and the seat 102 itself as force is exerted onto the handle 20.

Figure 8:
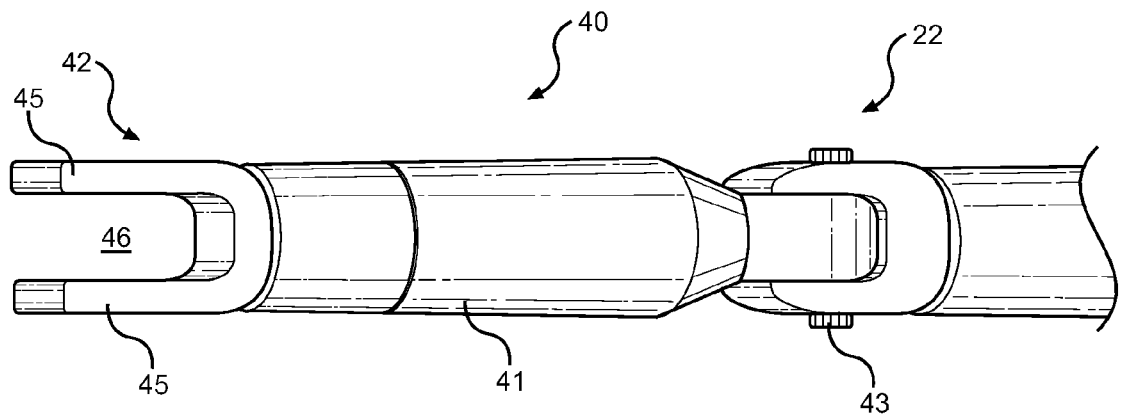
FIG. 8 shows an overhead view of the second contemplated secondary frame attachment member of the present invention.

Referring now to FIG. 8, there is shown an overhead view of the second contemplated embodiment of the secondary frame attachment member 40, as well as the second contemplated attachment end 42 thereof. As visualized, the attachment end includes a first and second arm 45 forming a largely U-shaped connector. Within the interior 46 of the U-shaped connector is an open space that is adapted to be consumed by the bicycle frame. In this way, the first and second arm 45 impart load on the bicycle frame only when the handle is rotating with respect thereto, and no secure clamp is otherwise necessary. The elongated body 41 of the frame attachment member 40 pivots with respect to the quick attachment mechanism 22 of the handle, and is pivotably attached 43 thereto. Overall, the first and second embodiments of the secondary frame attachment member and the first and second contemplated attachment end thereof are adapted to provide a second point of contact on the bicycle frame and secure thereto to prevent rotation of the handle while in use. The exact design of the member and its connection may vary within the scope of providing a secondary attachment point that is universal to any bicycle frame geometry relative to the seat post.

Referring now to FIG. 7, there is shown a side view of the bicycle training handle 20 of the present invention and one contemplated means of extending or retracting the length thereof. The position of the gripping end of the device is such that a standing user should be able to grasp the same without bending over or stretching during use. One means of adjusting the position of the gripping end is a telescoping construction handle, wherein the handle includes an upper portion 27 and lower portion 26 in telescopic relationship. Furthermore, the horizontal attachment end and gripping end of the handle 20 may be provided in telescopic relationship with the lower end 29 and upper end 28 of the central portion thereof, wherein the offset of the central portion and the gripping end can be telescopically controlled. The telescopic relationship is secured in a static state using set screws, spring pins, or equivalent fastening means.

Overall, the present invention is presented as a novel improvement in the art of bicycle training handles, wherein the shape of the device, its attachment to the bicycle seat post, and its secondary attachment members are submitted as advancements in the art. The shape of the device is one that allows the gripping end to be in a largely horizontal plane, while the attachment end comprises a quick attachment means that requires no tools or removal of the seat to mount or dismount the device. After attachment of the handle to the seat post, a (optional) secondary frame attachment member secures to the bicycle frame at a second location to prevent rotation of the handle attachment end around the bicycle seat post, and to prevent rotation of the seat post itself when the handle is being controlled by a standing user.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle training device, comprising:
    an elongated handle having a substantially horizontal attachment end, an upstanding central portion, and a substantially horizontal gripping end;
    said handle comprising a substantially S-shape;
    said attachment end comprising a quick attachment mechanism adapted to operably surround and secure to a bicycle seat post without tools and without removing said seat post;
    a secondary bicycle frame attachment member extending from said attachment end;
    the secondary bicycle frame attachment member comprising an elongated body portion having a frame attachment end adapted to secure to a bicycle frame upper rail;
    said body portion having at least one pivot joint for positioning said body portion relative to said attachment end of said handle;
    said secondary bicycle frame attachment member adapted to secure to the frame of a bicycle adjacent to its seat post;
    said secondary bicycle frame attachment member adapted to prevent lateral movement of said attachment end when controlling said handle.

2. The bicycle training device of claim 1, wherein said quick attachment mechanism further comprises a cam lock mechanism adapted to secure around a bicycle seat post.

3. The bicycle training device of claim 1, wherein said central portion of said elongated handle comprises a telescoping upper and lower portion.

4. The bicycle training device of claim 1, wherein said gripping end of said elongated handle comprises a telescoping relationship with respect to said central portion.

5. The bicycle training device of claim 1, wherein said attachment end of said elongated handle comprises a telescoping relationship with respect to said central portion.

6. A bicycle training device, comprising:
    an elongated handle having a substantially horizontal attachment end, an upstanding central portion, and a substantially horizontal gripping end;
    said handle comprising a substantially S-shape;
    said attachment end comprising a quick attachment mechanism adapted to operably surround and secure to a bicycle seat post without tools and without removing said seat post;
    a secondary bicycle frame attachment member extending from said attachment end;
    the secondary bicycle frame attachment member comprising an elongated body portion having a frame attachment end adapted to secure to a bicycle frame upper rail;
    said frame attachment end comprising cam lock mechanism adapted to secure around a bicycle frame rear portion;
    said secondary bicycle frame attachment member adapted to secure to the frame of a bicycle adjacent to its seat post;

said secondary bicycle frame attachment member adapted to prevent lateral movement of said attachment end when controlling said handle.

7. The bicycle training device of claim 6, wherein said quick attachment mechanism further comprises a cam lock mechanism adapted to secure around a bicycle seat post.

8. The bicycle training device of claim 6, wherein said central portion of said elongated handle comprises a telescoping upper and lower portion.

9. The bicycle training device of claim 6, wherein said gripping end of said elongated handle comprises a telescoping relationship with respect to said central portion.

10. The bicycle training device of claim 6, wherein said attachment end of said elongated handle comprises a telescoping relationship with respect to said central portion.

11. A bicycle training device, comprising:
- an elongated handle having a substantially horizontal attachment end, an upstanding central portion, and a substantially horizontal gripping end;
- said handle comprising a substantially S-shape;
- said attachment end comprising a quick attachment mechanism adapted to operably surround and secure to a bicycle seat post without tools and without removing said seat post;
- a secondary bicycle frame attachment member extending from said attachment end;
- the secondary bicycle frame attachment member comprising an elongated body portion having a frame attachment end adapted to secure to a bicycle frame upper rail;
- said frame attachment end comprising a U-shaped connector adapted to secure around a bicycle frame rear portion;
- said secondary bicycle frame attachment member adapted to secure to the frame of a bicycle adjacent to its seat post;
- said secondary bicycle frame attachment member adapted to prevent lateral movement of said attachment end when controlling said handle.

12. The bicycle training device of claim 11, wherein said quick attachment mechanism further comprises a cam lock mechanism adapted to secure around a bicycle seat post.

13. The bicycle training device of claim 11, wherein said central portion of said elongated handle comprises a telescoping upper and lower portion.

14. The bicycle training device of claim 11, wherein said gripping end of said elongated handle comprises a telescoping relationship with respect to said central portion.

15. The bicycle training device of claim 11, wherein said attachment end of said elongated handle comprises a telescoping relationship with respect to said central portion.

\* \* \* \* \*